US011525928B2

(12) United States Patent
Imamura

(10) Patent No.: US 11,525,928 B2
(45) Date of Patent: Dec. 13, 2022

(54) ELECTRONIC DEVICE, PAUSE DETERMINATION METHOD, AND STORAGE MEDIUM

(71) Applicant: CASIO COMPUTER CO., LTD., Tokyo (JP)

(72) Inventor: Keiichi Imamura, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 291 days.

(21) Appl. No.: 16/848,227

(22) Filed: Apr. 14, 2020

(65) Prior Publication Data

US 2020/0333473 A1 Oct. 22, 2020

(30) Foreign Application Priority Data

Apr. 18, 2019 (JP) .............................. JP2019-079685

(51) Int. Cl.
*G01S 19/52* (2010.01)
*H04B 1/3827* (2015.01)

(52) U.S. Cl.
CPC ............ *G01S 19/52* (2013.01); *H04B 1/3827* (2013.01)

(58) Field of Classification Search
CPC . G01S 19/52; G01S 5/14; G01S 19/55; G01C 21/36; G01C 21/10; G01C 22/00; G01C 22/006; G06F 3/01; G06F 3/011; G06F 3/0416; G01P 13/00; H04B 1/3827; H04B 7/24; H04B 7/26
See application file for complete search history.

(56) References Cited

U.S. PATENT DOCUMENTS 6,140,986 A * 10/2000 Wilkinson ............... G09G 3/22
345/589
7,701,491 B2 4/2010 Abe et al.
8,531,532 B2 9/2013 Imamura et al.
(Continued)

FOREIGN PATENT DOCUMENTS

JP 08201070 A * 8/1996
JP H08201070 A 8/1996
(Continued)

OTHER PUBLICATIONS

JP 08201070-A European Patent Office (EPO) machine translation (Year: 1996).*
(Continued)

*Primary Examiner* — Erin F Heard
*Assistant Examiner* — Kenneth W Good
(74) *Attorney, Agent, or Firm* — Holtz, Holtz & Volek PC

(57) ABSTRACT

Provided is an electronic device capable of suitably determining whether a user is moving or stationary. The electronic device includes a speed acquisition unit that acquires a user's moving speed and a processor that determines whether the user is in a moving state or in a pause state. In the moving state, the processor determines that a transition from the moving state to the pause state has occurred in the case where the moving speed acquired by the speed acquisition unit is less than the pause speed threshold. In the pause state, the processor determines that a transition from the pause state to the moving state has occurred in the case where the moving speed acquired by the speed acquisition unit is equal to or more than the moving speed threshold.

19 Claims, 8 Drawing Sheets

(56) References Cited

U.S. PATENT DOCUMENTS

| | | |
|---|---|---|
| 8,547,449 B2 | 10/2013 | Imamura |
| 8,723,976 B2 | 5/2014 | Imamura |
| 8,760,534 B2 | 6/2014 | Imamura |
| 9,332,524 B2 | 5/2016 | Imafuku et al. |
| 10,305,993 B2 | 5/2019 | Imamura |
| 10,509,562 B2 | 12/2019 | Kachi et al. |
| 10,531,234 B2 | 1/2020 | Imamura |
| 10,546,188 B2 | 1/2020 | Imamura |
| 10,571,282 B2 | 2/2020 | Imamura |
| 10,762,462 B1* | 9/2020 | Hapgood ............... G01C 21/12 |
| 2013/0045752 A1* | 2/2013 | Fukumoto ............ H04W 4/026 |
| | | 455/456.1 |
| 2013/0245986 A1* | 9/2013 | Grokop .................. G01P 13/00 |
| | | 702/141 |
| 2014/0180626 A1* | 6/2014 | Kimishima ............. G01S 19/49 |
| | | 702/160 |
| 2016/0041195 A1 | 2/2016 | Negoro et al. |
| 2016/0146946 A1* | 5/2016 | Gobara .................. G01S 19/19 |
| | | 702/94 |
| 2016/0161281 A1* | 6/2016 | Schuijers ............. G01C 22/006 |
| | | 702/160 |
| 2017/0177067 A1 | 6/2017 | Okada et al. |
| 2018/0181080 A1 | 6/2018 | Imamura |
| 2018/0181633 A1 | 6/2018 | Imamura |
| 2018/0356534 A1* | 12/2018 | Sugiyama ............. G06F 3/0346 |
| 2019/0094386 A1* | 3/2019 | Matsue .................. G01S 19/28 |
| 2019/0361588 A1* | 11/2019 | Sepczuk ............... G06F 3/0484 |
| 2020/0110371 A1 | 4/2020 | Suzuki et al. |

FOREIGN PATENT DOCUMENTS

| | | |
|---|---|---|
| JP | H11258324 A | 9/1999 |
| JP | 2014035218 A | 2/2014 |
| JP | 2015154988 A | 8/2015 |
| JP | 2016038242 A | 3/2016 |
| JP | 2017091163 A | 5/2017 |

OTHER PUBLICATIONS

Japanese Office Action (and English language translation thereof) dated May 11, 2021 issued in Japanese Application No. 2019-079685.

* cited by examiner

ELECTRONIC DEVICE, PAUSE DETERMINATION METHOD, AND STORAGE MEDIUM

CROSS-REFERENCES TO RELATED APPLICATIONS

This application claims priority to Japanese Patent Application No. 2019-079685 filed on Apr. 18, 2019, and the entire content of the basic application thereof is hereby incorporated herein by reference.

BACKGROUND

The present technical field relates to an electronic device, a pause determination method, and a storage medium.

For example, Japanese Patent Application Laid-Open No. H 11-258324 discloses a configuration in which a value higher than 0 km/h is set as a threshold for considering that the user is in a pause state. This is to prevent an erroneous determination that the user is moving when a moving speed is measured to be higher than 0 km/h, due to an error on positioning or the like, even though a user is not moving.

One embodiment includes: a speed acquisition unit that acquires a moving speed of a user; and a processor that determines whether the user is in a moving state or in a pause state, wherein, in the moving state, the processor counts the number of times that the moving speed acquired by the speed acquisition unit is less than a pause speed threshold and determines that a transition from the moving state to the pause state has occurred when the number of times that the moving speed is less than the pause speed threshold has reached a pause determination value; in the pause state, the processor counts the number of times that the moving speed acquired by the speed acquisition unit is equal to or more than the moving speed threshold and determines that a transition from the pause state to the moving state has occurred when the number of times that the moving speed is equal to or more than the moving speed threshold has reached a moving determination value; and the pause determination value is different from the moving determination value.

DETAILED DESCRIPTION

Figure 1:
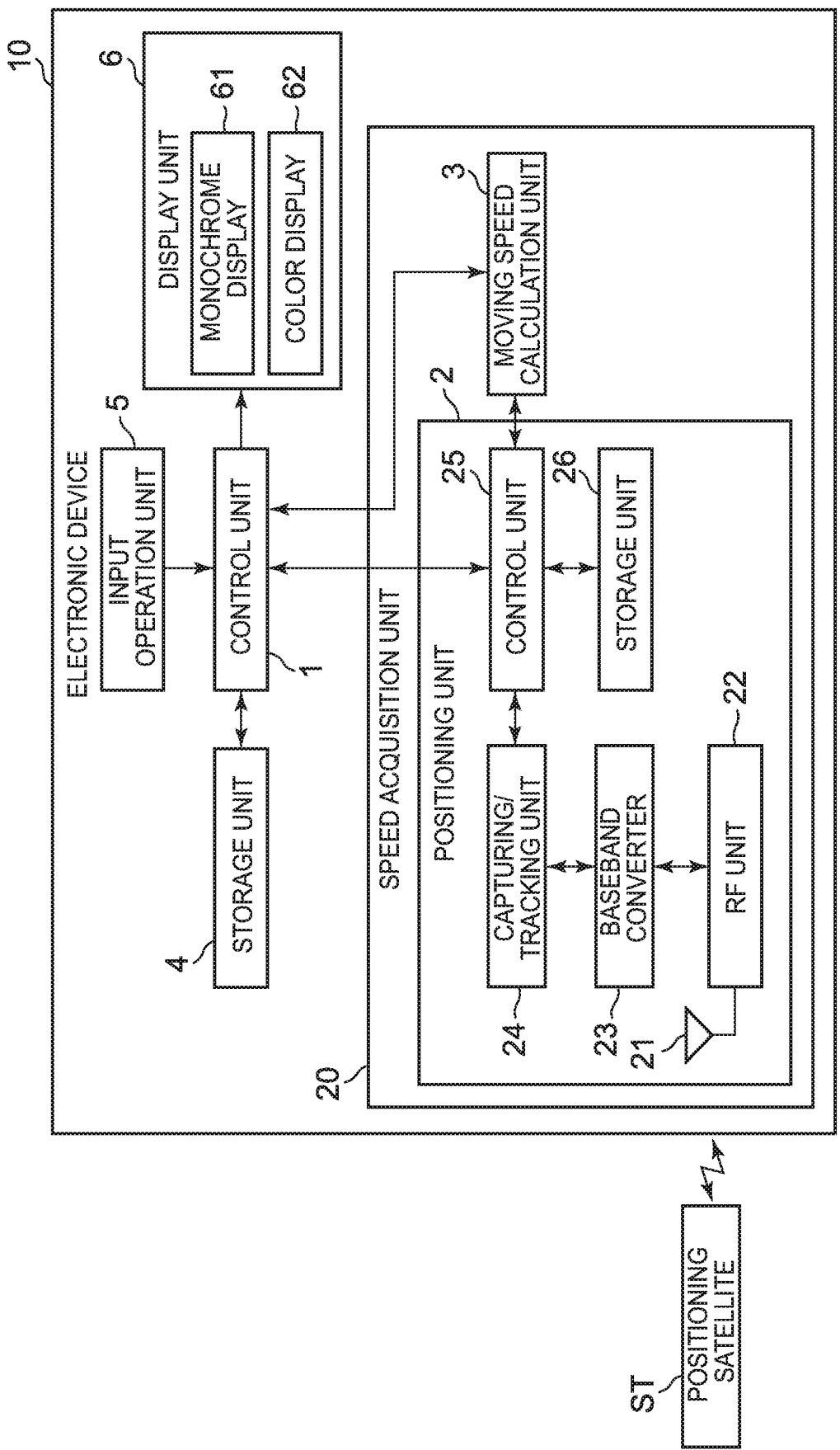
FIG. 1 is a block diagram illustrating a configuration of an electronic device according to the present embodiment.

Hereinafter, embodiments will be described in detail with reference to accompanying drawings. The embodiments described below, however, are merely intended for illustrating an electronic device, a pause determination method, and a pause determination program for embodying the technical concept of the embodiments of the present invention, but the present invention is not limited to the following description. Moreover, in the following description, the same or similar components or steps are denoted by the same reference numerals, and the description of those components or steps will be omitted appropriately.

[Electronic Device]

The configuration of an electronic device according to the present embodiment will be described with reference to FIG. 1. FIG. 1 is a block diagram illustrating a configuration of an electronic device according to the present embodiment. The electronic device according to the present embodiment is a portable information terminal such as a smartphone or a wearable terminal such as, for example, a smartwatch having a running recording (recording a running distance, a running speed, a movement trajectory, exercise time, or the like) function.

An electronic device 10 includes a control unit 1, a speed acquisition unit 20 having a positioning unit 2 that performs positioning with a global navigation satellite system (GNSS), a storage unit 4, an operation unit 5, and a display unit 6, wherein a part of the operation unit 5 and the display unit 6 constitute a touch panel.

The control unit 1, which is a central processing unit (CPU), executes a program stored in the storage unit 4 to control the speed acquisition unit 20 or the display unit 6. Furthermore, the control unit 1 determines whether a user is currently in a state of moving (for example, running) (moving state) or in a state of being stationary (pause state) on the basis of the moving speed calculated by the speed acquisition unit 20, as described later.

The speed acquisition unit 20 includes the positioning unit 2 and a moving speed calculation unit 3. The positioning unit 2 acquires the current location of the electronic device 10 on the basis of a signal received from a positioning satellite ST. The moving speed calculation unit 3 calculates the moving speed of the electronic device 10 from a temporal change in the current location. The positioning unit 2, which is a GNSS receiving unit, includes an antenna 21, a radio frequency (RF) unit 22, a baseband converter 23, a capturing/tracking unit 24, a control unit 25, and a storage unit 26. The moving speed calculation unit 3 may be provided as a part of a CPU that constitutes the control unit 25 or the control unit 1. With respect to the speed acquisition unit 20, the control unit 1 causes the positioning unit 2 to acquire information on the current location and causes the moving speed calculation unit 3 to calculate a moving speed for each predetermined unit time t (at predetermined time intervals).

The RF unit 22 includes a low noise amplifier (LNA), a band-pass filter (BPF), a local oscillator, a mixer, and the like, and then receives satellite radio waves in the L1 band (1.57542 GHz in the GPS satellite), selectively allows signals from the positioning satellite ST to pass, amplifies the signals, and converts the signals to intermediate frequency signals (IF). The baseband converter 23 acquires a baseband signal (a code string related to a navigation message) by applying a C/A (clear and acquisition, coarse and access) code for each positioning satellite to the intermediate frequency signal acquired by the RF unit 22. The capturing/tracking unit 24 calculates a correlation value relative to a C/A code in each phase of each positioning satellite for the intermediate frequency signal acquired by the RF unit 22 to specify peaks of the signal, thereby identifying the received signals from the positioning satellite ST and their phases. The capturing/tracking unit 24 provides the baseband converter 23 with phase information feedback in order to continuously acquire the code string related to the navigation message from the positioning satellite ST according to the identified C/A code and the phase thereof for the positioning satellite ST.

The control unit 25, which is a CPU, controls the RF unit 22 and the baseband converter 23 according to the control signal input from the control unit 1 (host CPU) or setting data. The storage unit 26 provides the control unit 25 with a working memory area and stores various setting data related to positioning and positioning histories. More specifically, the storage unit 26 stores orbit information (ephemeris), predicted orbit information (almanac), a program for performing positioning, and the last positioning date and time and position or the like for each positioning satellite.

The storage unit 4, which is a flash memory or a RAM, stores a program for the electronic device 10 to perform a function of an electronic clock or a running recording function, a program for controlling the positioning unit 2 and the moving speed calculation unit 3, data necessary for executing these programs, and the like. The storage unit 4 further stores a program for the control unit 1 to determine whether a user is in the moving state or in the pause state, data necessary for executing the program, and the like.

The operation unit 5, which is provided for user's manual operation, includes one or more crowns or push buttons provided on the outer periphery or the like of the body (a portion exclusive of a wearing band) of the electronic device 10 and a touch panel (not illustrated) integrated with the display unit 6.

The display unit 6, which is a liquid crystal display or an organic EL display that is provided on a dial plate in a wristwatch, displays information in text and an image. The display unit 6 includes a monochrome display 61 having a function of displaying a monochrome image and a color display 62 having a function of displaying a color image, with a two-layer structure in which, for example, the monochrome display 61 is arranged on the front side and the color display 62 is arranged on the inner side. With the operations of the operation unit 5, a user is able to switch and display the display contents and images between a monochrome image and a color image. In addition, for power saving, the display unit 6 is configured to switch the display to an only monochrome image display of the current time or the like or to a non-display mode if no operation is performed on the operation unit 5 for a certain period of time. Moreover, the electronic device 10 may include a notification means by voice from a speaker or the like or a notification means using a vibrator or the like with an actuator.

The information displayed by the display unit 6 is not particularly limited, but may be, for example, the current time, the reception status of satellite radio waves, the moving time, the moving distance, the user's speed, the running time, calorie consumption, the map and movement trajectory, or the like, and additionally whether the state is a moving state or a pause state can also be displayed. The electronic device 10 may be configured to notify the user of the above information in real time by a display on the display unit 6, voice, or vibration, or to display the information on the display unit 6 by operations of the operation unit 5.

In the following embodiments, description will be made illustrating that the moving state is a running state, unless otherwise noted, as description for an electronic device for running users. Therefore, for example, when a user is walking at a moving speed of about 4 to 5 km/h, the user is determined to be in the pause state. In this specification, the running state and the pause state mean results of the determination by the electronic device according to the embodiments and do not always match user's actual behaviors.

First Embodiment

Description will be made on a method according to a first embodiment for determining the state of a user wearing the electronic device 10. Table 1 exemplifies values used for determining state transitions. These values are preset and stored in the storage unit 4.

TABLE 1

| User's state | Speed threshold | Determination value | Reset value | Determination by value |
|---|---|---|---|---|
| Running state | $V_p$ 5.0 km/h | $T_p$ 10 (t = 1 s) 3 (t = 5 s) | $R_r$ 3 | $W_R$ 20 |
| Pause state | $V_r$ 7.0 km/h | $T_r$ 5 (t = 1 s) 2 (t = 5 s) | $R_p$ 2 | $W_P$ 5 |

When the user is in the running state, a pause speed threshold $V_p$, a pause determination value $T_p$, a moving reset value $R_r$, and a pause determination standby value $W_R$ are used. Incidentally, t indicates a unit time in which the value V of the user's moving speed is acquired. The pause speed threshold $V_p$ is a value with which the user's moving speed V is compared when the control unit 1 determines whether the user has transitioned from the running state to the pause state. Moreover, the pause determination value $T_p$ indicates the number of times of determination required for the control unit 1 to determine that the state has transitioned to the pause state. For example, when the number of times that the user's moving speed V is determined to be lower than the pause speed threshold $V_p$ has reached the pause determination value $T_p$, it is determined that the state has transitioned to the pause state. Furthermore, the pause determination value $T_p$ is set according to a value of the unit time t. The number of times that the user's moving speed V is determined to be lower than the pause speed threshold $V_p$ is able to be counted by incrementing a determination counter j, which is a counter value stored in the storage unit 4, using the control unit 1. On the other hand, the moving reset value $R_r$ is a value set to cause the determination counter j to 0, in other words, to initialize the determination counter j. If the number of times that the user's moving speed V is successively determined to be equal to or more than the pause speed threshold $V_p$ has reached the moving reset value $R_r$, the control unit 1 sets the value of the determination counter j to 0. The number of times that the user's moving speed V is determined to be equal to or more than the pause speed threshold $V_p$ is able to be counted by incrementing the determination reset counter k, which is a counter value stored in the storage unit 4, using the control unit 1. Moreover, the pause determination standby value $W_R$ indicates the number of times that the user's moving speed V is acquired without determining the state transition. The number of times that the user's moving speed V is acquired is able to be counted by incrementing the state counter i, which is a counter value stored in the storage unit 4, using the control unit 1.

If the user is in the pause state, the moving speed threshold $V_r$, the moving determination value $T_r$, the pause reset value $R_p$, and the moving determination standby value $W_p$ are used. The moving speed threshold $V_r$ is a value with which the value V of the user's moving speed is compared when the control unit 1 determines whether the user has transitioned from the pause state to the running state. Moreover, the moving determination value $T_r$ indicates the number of times of determination required for the control unit 1 to determine that the state has transitioned to the running state. For example, when the number of times that the user's moving speed V is determined to be equal to or more than the moving speed threshold $V_r$ has reached the moving determination value $T_r$, it is determined that the state has transitioned to the running state. Furthermore, the moving determination value $T_r$, is set according to the value of the unit time t. The number of times that the user's moving speed V is determined to be equal to or more than the moving speed threshold $V_r$ is able to be counted by incrementing the determination counter j, which is a counter value stored in the storage unit 4, using the control unit 1. On the other hand, the pause reset value $R_p$ is a value set to cause the value of the determination counter j to 0, in other words, to initialize the determination counter j. If the number of times that the user's moving speed V is successively determined to be lower than the moving speed threshold $V_r$ has reached the pause reset value $R_p$, the control unit 1 sets the value of the determination counter j to 0. The number of times that the user's moving speed V is determined to be lower than the moving speed threshold $V_r$ is able to be counted by incrementing the determination reset counter k, which is a counter value stored in the storage unit 4, using the control unit 1. Moreover, the moving determination standby value $W_p$ indicates the number of times that the user's moving speed V is acquired without determining the state transition. The number of times that the user's moving speed V is acquired is able to be counted by incrementing the state counter i, which is a counter value stored in the storage unit 4, using the control unit 1.

(Pause Determination Method in Running State)

Figure 2:
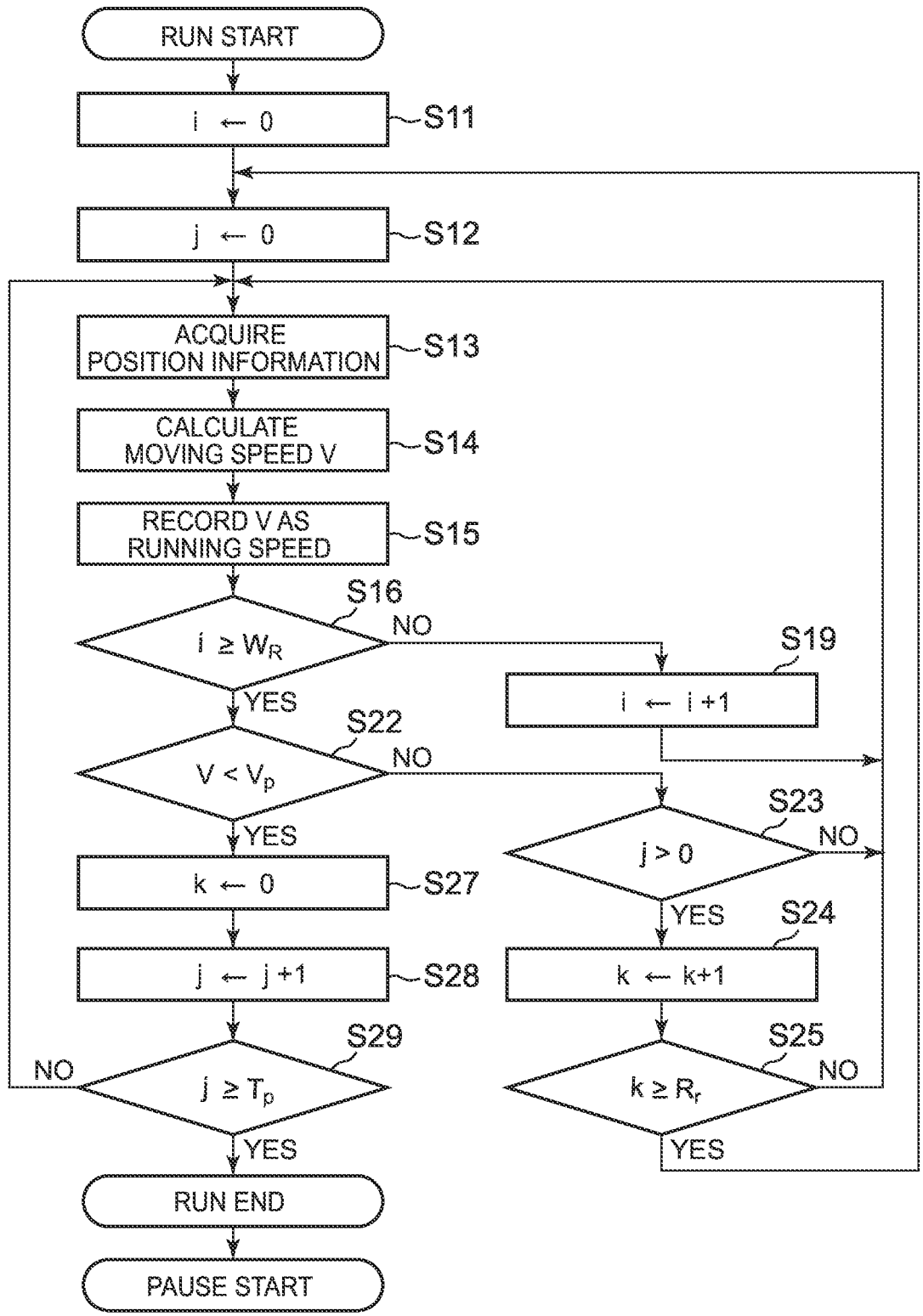
FIG. 2 is a flowchart illustrating a procedure for a pause determination method according to a first embodiment.

Description will be made on a procedure for determining a transition from the running state to the pause state with the electronic device 10, in other words, a method of performing pause determination after the control unit 1 determined that the user is in the running state, with reference to FIG. 2. FIG. 2 is a flowchart illustrating a procedure for a pause determination method according to the first embodiment, in which the pause determination is performed in the electronic device according to the present embodiment.

When the running state starts (RUN START), in other words, when it is determined that the user's state has transitioned from the pause state to the running state, the control unit 1, first, initializes the state counter i to 0 and writes 0 into the storage unit 4 (S11) and then initializes the determination counter j to 0 and writes 0 into the storage unit 4 (S12). Thereafter, the speed acquisition unit 20 acquires the position information (S13) and then calculates the moving speed V on the basis of a difference between this position information and the position information acquired at the previous time (S14). Subsequently, the control unit 1 writes the moving speed V as a user's running speed into the storage unit 4 in association with the position information and the acquisition time (S15). Subsequently, the control unit 1 compares the state counter i with the pause determination standby value $W_R$ (S16), and if i<$W_R$ (S16: NO), increments the state counter i, overwrites the storage unit 4 (S19), and returns to step S13. Until the state counter i stored in the storage unit 4 reaches the pause determination standby value $W_R$ (S16: YES), the control unit 1 repeatedly performs a series of processes of the steps S13 to S16 and S19 in the above for each unit time t.

When the state counter i has reached the pause determination standby value $W_R$ (S16: YES), the control unit 1 moves to step S22 to compare the moving speed V calculated in the previous step S14 with the pause speed threshold $V_p$. In other words, the control unit 1 determines whether or not the moving speed V is less than the pause speed threshold $V_p$, with respect to the moving speed V calculated at the ($W_R$+1)th time or later after the transition to the current running state. If the moving speed V is equal to or more than the pause speed threshold $V_p$ (S22: NO), the control unit 1 compares the determination counter j, which is stored in the storage unit 4, with 0 (S23). If j=0 (S23: NO), the control unit 1 returns to step S13. Incidentally, in the current running state, to be exact, after performing step S12, if the moving speed V is equal to or more than the pause speed threshold $V_p$ in all steps so far of step S22, "j=0" is satisfied. Therefore, the control unit 1 repeatedly performs the series of processes of steps S13 to S16, S22, and S23 until the moving speed V less than the pause speed threshold $V_p$ is measured (S22: YES).

On the other hand, if the moving speed V is less than the pause speed threshold $V_p$ (the moving speed V clears the pause speed threshold $V_p$) (S22: YES), the control unit 1 initializes the determination reset counter k to 0 and writes the value into the storage unit 4 (S27). Moreover, the control unit 1 increments the determination counter j, overwrites the storage unit 4 (S28), and then compares the value with the pause determination value $T_p$ (S29). If j<$T_p$ (S29: NO), the control unit 1 returns to step S13. Therefore, until the determination counter j stored in the storage unit 4 reaches a value equal to or more than the pause determination value $T_p$ (S29: YES), the control unit 1 repeatedly performs the processes of steps S13 to S16, S22, and steps S27 to S29 or step S23. On the other hand, if the determination counter j is equal to or more than the pause determination value $T_p$ (S29: YES), in other words, when the moving speed V less than the pause speed threshold $V_p$ has been measured $T_p$ times, the control unit 1 determines that the user's state has transitioned from the running state to the pause state. In other words, the running state ends (RUN END) and the pause state starts (PAUSE START).

Incidentally, after the moving speed V less than the pause speed threshold $V_p$ is measured once or more, the determination counter j, which is stored in the storage unit 4, has a value of 1 or higher. Therefore, if the moving speed V equal to or more than the pause speed threshold $V_p$ is measured before the moving speed V less than the pause speed threshold $V_p$ is measured $T_p$ times in total (S22: NO), the control unit 1 determines that the value of the determination counter j is higher than 0 in step S23 (S23: YES) and then moves to step S24. The control unit 1 increments the determination reset counter k, overwrites the storage unit 4 (S24), and then compares the value with the moving reset value $R_r$ (S25). If k<$R_r$ (S25: NO), the control unit 1 returns to step S13 to perform a series of processes of steps S13 to S16, S22 and the like. On the other hand, if the determination reset counter k, which is stored in the storage unit 4, is equal to or more than the moving reset value $R_r$ (S25: YES), the control unit 1 initializes the determination counter j to 0 (S12) and then repeatedly performs a series of processes of steps S13 to S16, S22, and steps S27 to S29 or step S23 until the determination counter j reaches the pause determination value $T_p$. In addition, if the moving speed V measured next is less than the pause speed threshold $V_p$ (S22: YES) when the determination reset counter k is 1 or more and less than $R_r$, the control unit 1 initializes the determination reset counter k to 0 and writes 0 into the storage unit 4 (S27). In other words, if the moving speed V less than the pause speed threshold $V_p$ is measured $T_p$ times before the moving speed V equal to or more than the pause speed threshold $V_p$ is successively measured $R_r$, times, the control unit 1 determines that a transition from the running state to the pause state has occurred.

(Moving Determination [Pause Release] Method in Pause State)

Figure 3:
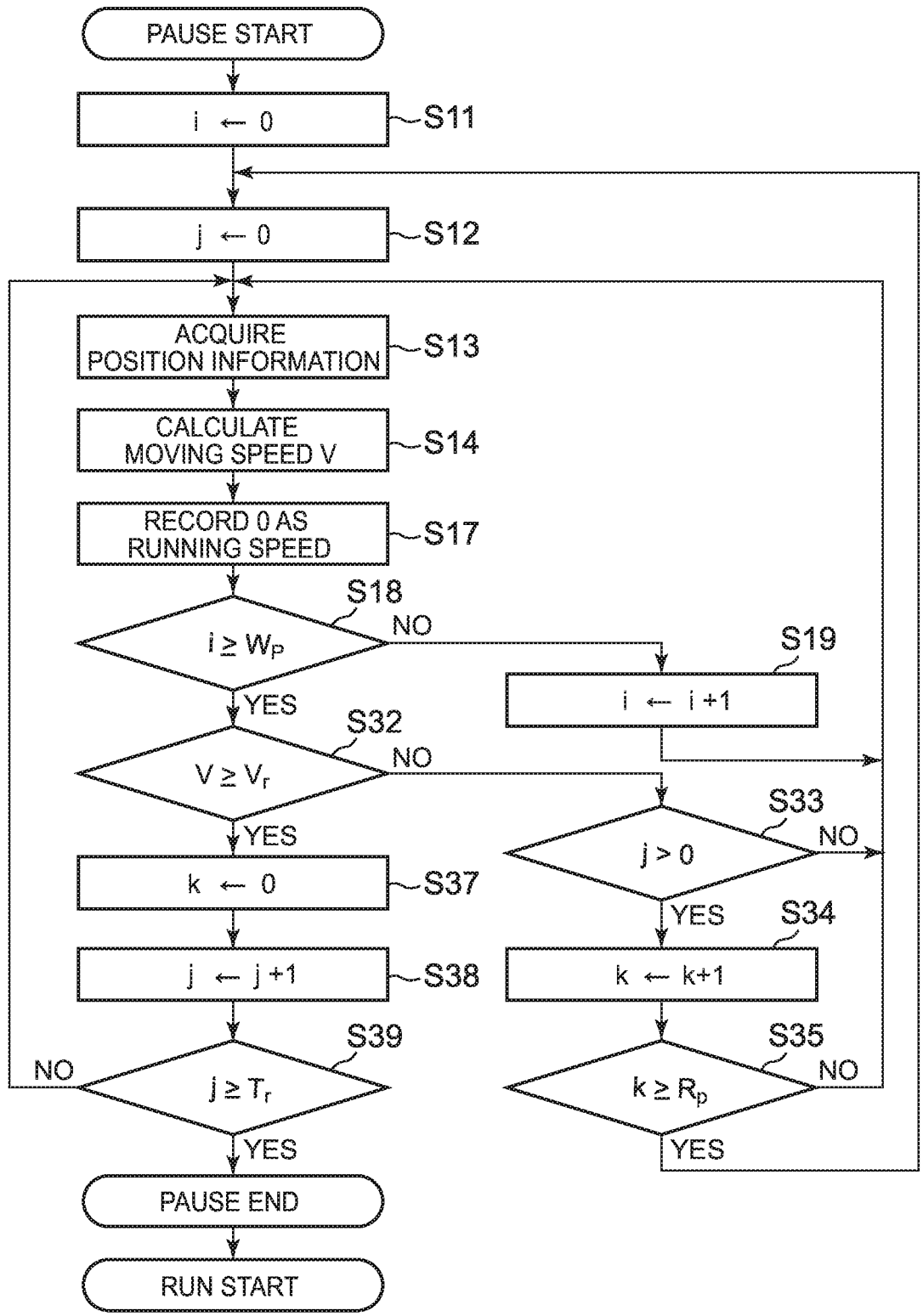
FIG. 3 is a flowchart illustrating a procedure for a moving determination method according to the first embodiment.

Referring to FIG. 3, description is made on a procedure for determining a transition from the pause state to the running state with the electronic device 10, in other words, a method in which the control unit 1 performs moving determination after determining that a user is in the pause state. FIG. 3 is a flowchart illustrating a procedure for a moving determination method according to the first embodiment for performing the moving determination in the electronic device according to this embodiment.

As illustrated in FIG. 3, the values used for determination are replaced with those in Table 1 in the pause state and then the determination of a transition from the pause state to the running state is performed in the same procedure as for the running state illustrated in FIG. 2. Specifically, the control unit 1 determines whether or not the moving speed V is equal to or more than the moving speed threshold $V_r$ (the moving speed V clears the moving speed threshold $V_r$) (S32). Furthermore, the respective thresholds are different from each other, with respect to the state counter i, the determination counter j, and the determination reset counter k (S18, S39, and S35). Furthermore, in the pause state, the control unit 1 records 0 km/h as a user's running speed (S17) without recording the moving speed V calculated in step S14. Moreover, the control unit 1 does not record (update) the position information acquired in step S13, but records position information acquired last in the running state before the transition to the pause state or position information acquired at the first time in the pause state concerned. Therefore, in the pause state, the running speed 0 km/h is continued and the movement trajectory is fixed. The timing for recording the running speed or the like in step S17 may be before the timing for acquiring the position information (S13), for example. Alternatively, the information acquired in step S13 may be recorded each time with respect to position information.

In the electronic device 10, the state is set to the pause state at startup (for example, a running record start operation by a user) and the moving speed V is compared with the moving speed threshold $V_r$ (S32) and the state is transitioned to the running state according to a result of the comparison. In this regard, the electronic device 10 may be configured to determine the moving speed V from the first time without providing the moving determination standby value $W_p$.

Figure 4:
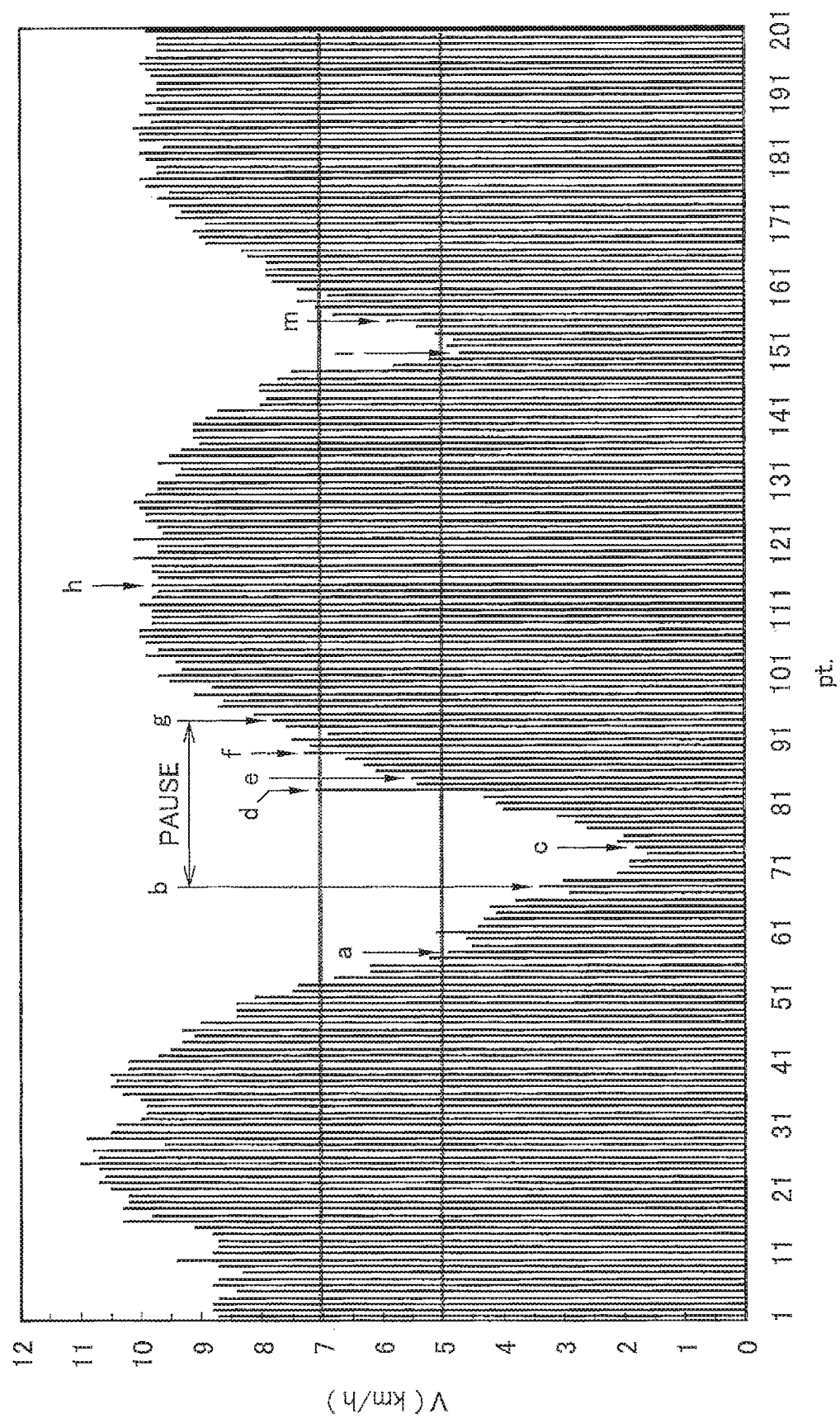
FIG. 4 is a graph illustrating changes in a user's moving speed acquired by a speed acquisition unit of the electronic device according to the present embodiment.

The electronic device 10 performs the procedures illustrated in FIGS. 2 and 3, by which the control unit 1 determines the user's state as described below in the changes of the moving speed illustrated in FIG. 4. FIG. 4 is a graph illustrating changes in the user's moving speed acquired by the speed acquisition unit of the electronic device according to this embodiment. The point on the horizontal axis (pt.) in FIG. 4 indicates the number of times the value of the moving speed has been acquired for each unit time t by the speed acquisition unit at the point. In FIG. 4, the moving speed is acquired at each second. Specifically, the unit time t equals 1 second. Moreover, in FIG. 4, it is assumed that the state at the first point is a running state and that time of 20 or more points has elapsed after a transition at the first point. Furthermore, values used for determination are as illustrated in Table 1.

As illustrated in FIG. 4, the moving speed that the speed acquisition unit 20 has calculated on the basis of the current location measured by the positioning unit 2 changes with a variation. In FIG. 4, the moving speed is around 8 to 11 km/h in a relatively high-speed range, while the moving speed decreases to about 2 km/h at around the 70th point and to about 5 km/h at around the 150th point, and thereafter each moving speed resumes high levels.

Whenever the moving speed V is acquired, the control unit 1 compares the moving speed V with 5.0 km/h, which is the pause speed threshold $V_p$, from the first point in FIG. 4. The user's moving speed V is then determined to be lower than the pause speed threshold $V_p$ at point a, at which the user's moving speed is lower than 5.0 km/h, and the control unit 1 increments the determination counter j. In other words, the control unit 1 increments the determination counter j to count the number of times that the user's moving speed V is determined to be lower than the pause speed threshold $V_p$. The moving speed V acquired between point a to point b is determined to be 5.0 km/h or more only once. Therefore, the determination reset counter k does not reach the moving reset value $R_r$, and the count of the number of times that the user's moving speed V is determined to be lower than the pause speed threshold $V_p$ is continued. Then, "j=10" is satisfied at point b, in other words, the determination counter j reaches 10, which is the pause determination value $T_p$, and the control unit 1 determines that a transition to the pause state has occurred.

With respect to the moving speed V acquired from the first time after the transition to the pause state to the fifth time, which corresponds to the moving determination standby value $W_p$, a state transition is not determined. The determination of a state transition is started from point c, with respect to the acquired moving speed V. Specifically, the control unit 1 compares the moving speed V acquired at point c and subsequent points is compared with 7.0 km/h, which is the moving speed threshold $V_r$. At point d when the moving speed reaches a value of 7.0 km/h or higher, the user's moving speed V is determined to be equal to or more than the moving speed threshold $V_r$ and the control unit 1 increments the determination counter j. In other words, the control unit 1 increments the determination counter j to count the number of times that the user's moving speed V is determined to be equal to or more than the moving speed threshold $V_r$. At point e, however, when the moving speed V is determined to be less than 7.0 km/h twice successively, the determination reset counter k has reached the pause reset value $R_p$ and therefore the determination counter j is initialized. Specifically, at the point e, the determination counter j reaches 0 (j=0). Thereafter, at point f when the moving speed rises to 7.0 km/h or higher again, the count of the determination counter j is started again. Then, "j=5" is satisfied at point g, in other words, the determination counter j reaches the moving determination value $T_r$ and the control unit 1 determines that a transition to the running state has occurred.

The determination of a state transition is not performed with respect to the moving speed V acquired from the first time after the transition to the running state to the 20th times, which corresponds to the pause determination standby value $W_R$, but the determination of a state transition is performed from point h with respect to the acquired moving speed V. In other words, the control unit 1 compares the moving speed V acquired at point h and subsequent points with 5.0 km/h, which is the pause speed threshold $V_p$, similarly to the above. Moreover, the moving speed V lower than 5.0 km/h at point 1 causes the control unit 1 to start counting of the determination counter j. The moving speed less than 5.0 km/h, however, is detected only three times in total at point 1 and subsequent points, and therefore the determination counter j does not reach 10, which is the pause determination value $T_p$. Thereafter, the moving speed maintains 5.0 km/h or higher, by which "k=3" is satisfied at point m, in other words, the determination reset counter k reaches 3, which is the moving reset value $R_r$, and the determination counter j is initialized. Thereby, the state does not transition to the pause state and the running state is continued. Therefore, in FIG. 4, the control unit 1 determines that the user is in the pause state (PAUSE) between b and g and in the running state in other ranges.

As illustrated in Table 1, the pause speed threshold $V_p$ is set to a value higher than 0 km/h. Moreover, the moving speed threshold $V_r$ is preferably set to a value equal to or more than the pause speed threshold $V_p$, and more preferably more than the pause speed threshold $V_p$. A relation of "$V_p < V_r$" makes it difficult to determine a user's state to be transitioned to the running state even if a certain high level of moving speed V is acquired due to a measurement error of the positioning unit 2 when the user is stationary. In addition, in the case where the user's running pace slows down, the relation of "$V_p < V_r$" makes it difficult to determine a user's state to be transitioned to the pause state even if the user continues to move without pausing. If, however, the pause speed threshold $V_p$ is too low or the moving speed threshold $V_r$ is too high, the determination sensitivity to the state transition decreases and the determination of the state transition is delayed, and further a state transition does not occur in some cases. Furthermore, if a difference ($V_r-V_p$) between the pause speed threshold $V_p$ and the moving speed threshold $V_r$ is too high, the moving speed V in the range of "$V_p \leq V < V_r$" is acquired continuously depending on a user's running or walking speed in some cases. At this time, the control unit 1 does not determine a state transition in both of the running state and the pause state. Therefore, even in the case of the same moving speed V, the moving speed V is recorded as a running speed if the speed decreases in the running state, though the moving speed V is not recorded if the speed increases in the pause state. Therefore, in order to uniquely determine the state with respect to the user's moving speed, the difference between the pause speed threshold $V_p$ and the moving speed threshold $V_r$ is preferably set to a low value, specifically, set to be small relative to a fluctuation range for the moving speed at which the user is running.

Alternatively, the difference between the pause speed threshold $V_p$ and the moving speed threshold $V_r$ may be set to be equal to or larger than the fluctuation range for the moving speed at which the user is running. According to this setting, if the moving speed V decreases so as to be less than the moving speed threshold $V_r$ and equal to or more than the pause speed threshold $V_p$ ($V_p \leq V < V_r$) in the running state, the control unit 1 estimates that the user is likely to continue running even if the user's pace slows down and continues to record the moving speed V as a running speed. On the contrary, after the transition to the pause state, the control unit 1 estimates that the user finishes running and moves by simply walking and the state does not transition to the running state as long as the value is less than the moving speed threshold $V_r$ ($V_p \leq V < V_r$) even if the user starts slow running or walking and the moving speed V is equal to or more than the pause speed threshold $V_p$. Furthermore, the moving determination value $T_r$ set to a low value causes a transition to a running state in a short period of time if the user increases the speed and the moving speed V becomes equal to or more than the moving speed threshold $V_r$, and therefore the transition to the running state is not so much delayed.

The speed thresholds $V_p$ and $V_r$ are preferably set on the basis of the moving speed at which the user is running. In other words, the moving speed threshold $V_r$ is preferably set to a value around the lower limit of a stable (continued for a long time) speed range during user's running and, for example, set to be 1 km/h lower than the lower limit of the aforementioned speed range. In addition, the pause speed threshold $V_p$ is set to a value equal to or less than the set moving speed threshold $V_r$. Preferably, the more the value is susceptible to a measurement error of the positioning unit 2, the higher the value of the pause speed threshold $V_p$ to be set is. For example, in FIG. 2, the moving speed changes within the range of about 8 km/h to 9.5 or to 10 km/h during user's running with some exceptions and therefore the moving speed threshold $V_r$ is set to a value of 7.0 km/h, which is 1 km/h lower than the lower limit 8 km/h. Moreover, in this embodiment, as described above, the pause speed threshold $V_p$ is set so that a difference from the moving speed threshold $V_r$ is larger than the fluctuation range (a range of about 8 km/h to 9.5 km/h or to 10 km/h) of the moving speed at which the user is running. In this specification, the pause speed threshold $V_p$ is set to a value of 5.0 km/h, which is 2.0 km/h lower than the moving speed threshold $V_r$. These settings make it difficult to determine that a user is in the pause state even if the user's pace slows down and the moving speed V in the range of "$V_p \leq V < V_r$" is continuously acquired as described above, thereby enabling the moving speed V to be continuously recorded as the running speed. The speed thresholds $V_p$ and $V_r$ are set by switching the mode by a user's operation from the operation unit 5 between modes in several steps according to specifications for running such as, for example, running for beginners (jogging), running for athletes, trail running, and the like, which are stored in the storage unit 4. Furthermore, although this embodiment has been described illustrating that the moving state is the running state, the present invention is not limited thereto. For example, the moving state may include a walking state, a running state by bicycle, and the like. In that case, for the speed thresholds $V_p$ and $V_r$, additional modes according to the moving speeds of walking, cycling, and the like may be preset. Moreover, the speed thresholds $V_p$ and $V_r$ may be set at startup or the like on the basis of results up to the user's last use of the electronic device 10.

The moving determination value $T_r$ is preferably set to be lower than the pause determination value $T_p$. The higher the pause determination value $T_p$, the more difficult it is to determine that a transition to the pause state has occurred even if the moving speed V decreases to be less than the pause speed threshold $V_p$ due to a decrease in the user's running pace or the like in the running state. Moreover, the higher the moving determination value $T_p$, the more difficult it is to determine that a transition to the running state has occurred even if the moving speed V increases to be equal to or more than the moving speed threshold $V_r$ due to a measurement error in the pause state. Therefore, if the determination values $T_p$ and $T_r$ are low, the influence or the like of a measurement error is significant and it easily leads to an erroneous determination that a state transition has occurred. On the other hand, the higher the determination values $T_p$ and $T_r$, the lower the determination sensitivity to the state transition is. Therefore, an inequality of "$T_p > T_r$" is set, by which it is more difficult to determine that a transition from the running state to the pause state has occurred than to determine that a transition from the pause state to the running state has occurred. This prevents a situation in which the electronic device 10 determines that the user is in a pause state though actually the user is running and does not record the moving speed V, the movement trajectory, or the like. Moreover, it is preferable to set the determination values $T_p$ and $T_r$ to be lower as the unit time t is longer. If the unit time t is long and the determination values $T_p$ and $T_r$ are too high, it takes time to determine a state transition, the determination of the state transition is delayed, and further the state transition may not occur. Moreover, if so, it is more difficult to notify the user of whether the current state is the running state or the pause state in real time. On the other hand, if the unit time t is short and the determination values $T_p$ and $T_r$ are low, the control unit 1 determines a state transition on the basis of the moving speed V acquired in a short period of time and therefore easily determines a state transition erroneously. If the determination values $T_p$ and $T_r$ are set to low values, the influence of a measurement error tends to increase. Therefore, preferably an adjustment is performed with a balance between the degree of measures against measurement errors and the time required for notifying the user of information. With respect to the determination values $T_p$ and $T_r$, the user may be allowed to set the values in several steps, similarly to the speed thresholds $V_p$ and $V_r$.

Although not particularly specified, the unit time t is preferably within a range of 1 to 5 seconds. The shorter the unit time t is, the greater the number of times (the number of points) per time for acquiring the moving speed V (S14) for determining a state transition is. Therefore, the influence of a measurement error of the positioning unit 2 is reduced and the accuracy of determination increases. The power consumption of the electronic device 10, however, increases. The unit time t also may be set by switching the mode therefor between modes in several steps by a user's operation.

The pause determination standby value $W_R$ is set to not perform comparison of the moving speed V (S22) to prevent an erroneous transition to the pause state since the moving speed V acquired immediately after a transition to the running state is unstable in some cases. Similarly, the moving determination standby value $W_p$ is set to not perform comparison of the moving speed V (S32) acquired immediately after a transition to the pause state. In other words, the determination standby values $W_R$ and $W_p$ are set to prevent a repetition of unnecessary state transitions. Preferably, the moving determination standby value $W_p$ is set to be less than the pause determination standby value $W_R$. This is to prevent a situation in which a user has actually resumed running in the pause state, but the state does not transition to the running state and the measured moving speed V or the like is not recorded. Furthermore, the determination standby values $W_R$ and $W_p$ may be set according to the unit time t similarly to the determination values $T_p$ and $T_r$. Alternatively, the moving speed V may be determined from the first time without setting the determination standby values $W_R$ and $W_p$, or only the pause determination standby value $W_R$ may be set. In this case, processes related to the state counter i (S11, S16, S18, and S19) are unnecessary.

Preferably, the moving reset value $R_r$ is lower than the pause determination value $T_p$, the pause reset value $R_p$ is lower than the moving determination value $T_r$, and each thereof is set to 2 or a higher value. This enables the influence of a measurement error to be reduced. Incidentally, if the reset values $R_r$ and $R_p$ are each 1, the control unit 1 determines that a state transition has occurred only when the moving speed V successively cleared the speed thresholds $V_p$ and $V_r$ (S22: YES, S32: YES). Therefore, if the moving speed V does not clear the speed thresholds $V_p$ and $V_r$ and the determination counter j is not 0 (S23: YES, S33: YES), the control unit 1 may initialize the determination counter j (S12) at that time point. Thus, the processes related to the determination reset counter k (S24, S25, S27/S34, S35, and S37) are unnecessary. The settings of "$R_r=1$" and "$R_p=1$" are preferable in the case where the determination values $T_p$ and $T_r$ are low so that the determination of a state transition is not easily delayed.

Moreover, the control unit 1 may determine that a state transition has occurred if the moving speed V has cleared the speed thresholds $V_p$ and $V_r$ the number of times of the determination values $T_p$ and $T_r$ in total from the starting the state, without setting one or both of the moving reset value $R_r$ and the pause reset value $R_p$. In other words, in the running state (FIG. 2), the control returns to step S13 directly if the moving speed V is equal to or more than the pause speed threshold $V_p$ (S22: NO) without performing steps S23 to S25 and S27. In the pause state (FIG. 3), the control returns to step S13 directly if the moving speed V is less than the moving speed threshold $V_r$ (S32: NO) without performing steps S33 to S35 and S37.

With setting of one or both of the pause determination value $T_p$ and the moving determination value $T_r$ to 1, the state may transition if the moving speed V has cleared the speed thresholds $V_p$ and $V_r$ once. In other words, if the moving speed V has cleared the speed thresholds $V_p$ and $V_r$ (S22: YES, S32: YES) without setting the determination values $T_p$ and $T_r$, the control unit 1 may determine that a state transition has occurred at that time point, thereby enabling the processes related to the determination counter j (S12, S28, S29/S38, and S39) to be unnecessary. In this case, the settings of the reset values $R_r$ and $R_p$ and the processes related to the determination reset counter k are also unnecessary. With these settings, a state transition can be determined early and with a simple procedure. Particularly a transition from the pause state to the running state may be determined with the above procedure so that the control unit 1 is able to determine that a state transition has occurred in less time according to the user's moving speed.

For example, Japanese Patent Application Laid-Open No. Hei 11-258324 discloses a configuration in which the speed having a value higher than 0 is set as a threshold for use in considering that a user is in a pause state. If the threshold set at that time is too high, a measured moving speed does not exceed the threshold though a user is moving, and the user may be considered to be in a pause state. Moreover, if the threshold is too low, a moving speed exceeding the threshold may be detected though the user is stationary due to a speed measurement error, by which the user is momentarily considered to be moving in some cases. As a result, it is difficult to determine a state transition between the moving state and the pause state accurately.

According to the first embodiment, however, an erroneous determination is less likely to occur by individually setting the pause speed threshold for use in determining a transition from the running state to the pause state and the moving speed threshold for use in determining a transition from the pause state to the running state. Furthermore, a state transition is determined to occur when the moving speed has cleared the speed threshold a unique number of times in each of the running state and the pause state, thereby further reducing erroneous determinations and omission of determination. In addition, the moving speed only in the running state is recorded as a running speed, thereby enabling the user to know the moving speed at which the user is actually running.

Second Embodiment

Figure 5:
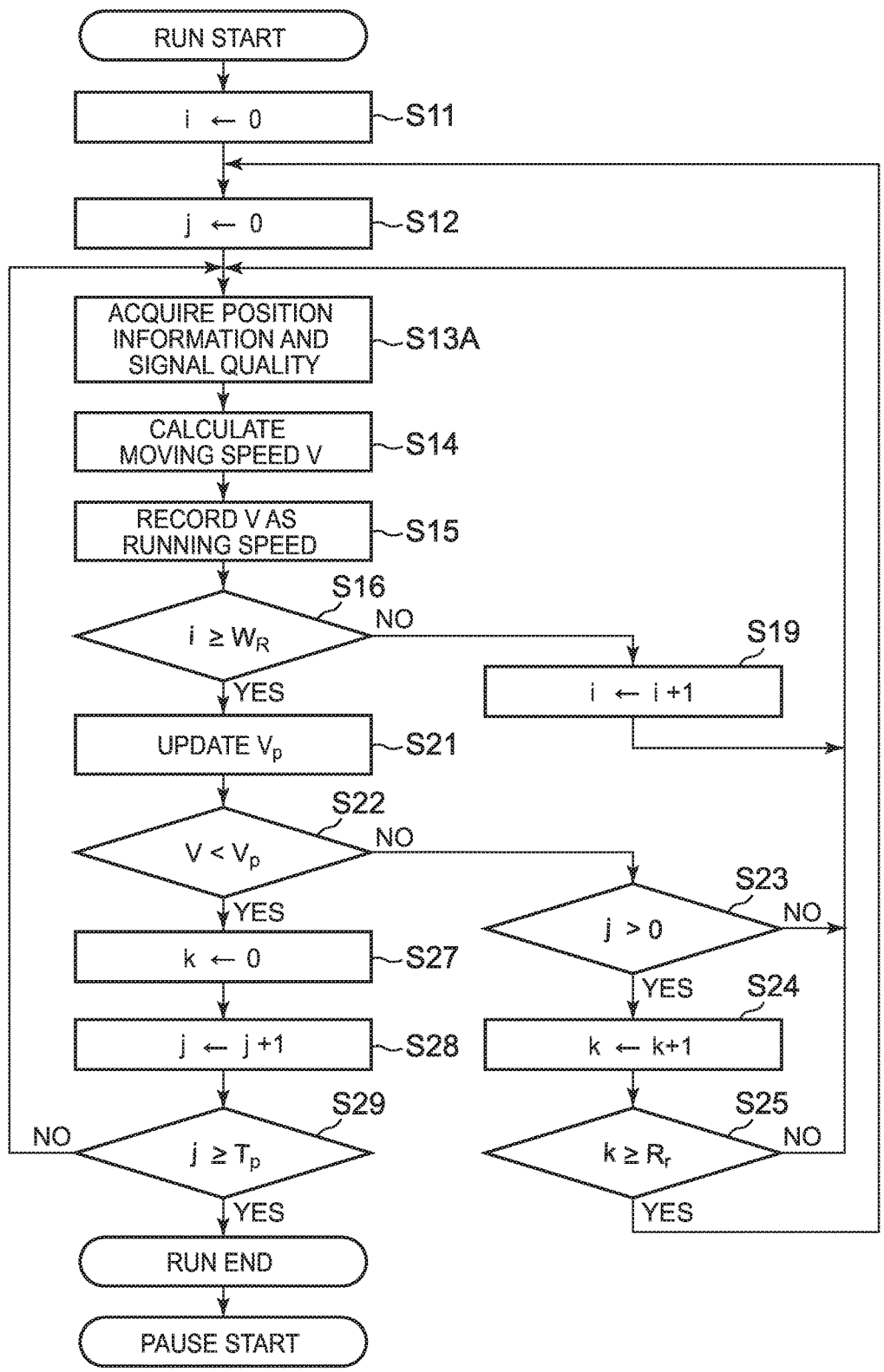
FIG. 5 is a flowchart illustrating a procedure for a pause determination method according to a second embodiment.

The moving speed tends to be calculated higher as an error of the position information is larger. Particularly, in the determination of a transition from the running state to the pause state, the acquired moving speed is high due to a measurement error and is not less than the pause speed threshold, by which a state transition is not easily determined. An error of the position information acquired based on a signal from a positioning satellite is mainly caused by a low signal quality. Therefore, the threshold for determining a state transition is changed on the basis of the signal quality, thereby enabling the determination accuracy to be further increased. Hereinafter, description will be made on a determination method according to a second embodiment of the present invention with reference to FIGS. 1, 5, and 6. FIG. 5 is a flowchart illustrating a procedure for a pause determination method according to the second embodiment, in which a pause determination in an electronic device according to this embodiment is performed.

Similarly to the first embodiment, the electronic device 10 illustrated in FIG. 1 is able to perform the pause determination method according to this embodiment. In this embodiment, however, the positioning unit 2 also acquires a signal quality from a positioning satellite ST. The signal quality, which is indicated by CNR (C/N, carrier-to-noise ratio) or SNR (S/N, signal-to-noise ratio), is obtained based on some or all of the indicators acquired by the capturing/tracking unit 24, the control unit 25, and the control unit 1, through it depends on the design. In this specification, CNR is used.

Furthermore, the control unit 1 calculates each of the pause speed threshold $V_p$ in the running state and the moving speed threshold $V_r$ in the pause state on the basis of CNR. Moreover, the storage unit 4 stores a program therefor. For example, with "CNR≥45 dB" as the best, $V_p$ and $V_r$ are set to 1.0 km/h and 6.5 km/h respectively ($V_p$=1.0 km/h and $V_r$=6.5 km/h). Each time CNR at 45 dB drops by 1 dB, the pause speed threshold $V_p$ increases by 0.16 km/h and the moving speed threshold $V_r$ increases by 0.02 km/h. Table 2 lists some of the values of the pause speed threshold $V_p$ and the moving speed threshold $V_r$ classified by CNR. Alternatively, the storage unit 4 may store the table as illustrated in Table 2, so that the control unit 1 acquires the pause speed threshold $V_p$ and the moving speed threshold $V_r$ on the basis of CNR. As described above, a position information error caused by a signal quality has a huge influence when a transition to the pause state is determined. Therefore, preferably an amount of change by CNR for the pause speed threshold $V_p$ is set to be larger than that for the moving speed threshold $V_r$. It should be noted, however that the settings are made so that the pause speed threshold $V_p$ does not exceed the moving speed threshold $V_r$.

TABLE 2

| CNR (dB) | $V_p$ (km/h) | $V_r$ (km/h) |
|---|---|---|
| 45~ | 1.0 | 6.5 |
| 20 | 5.0 | 7.0 |
| 15 | 5.8 | 7.1 |

Figure 6:
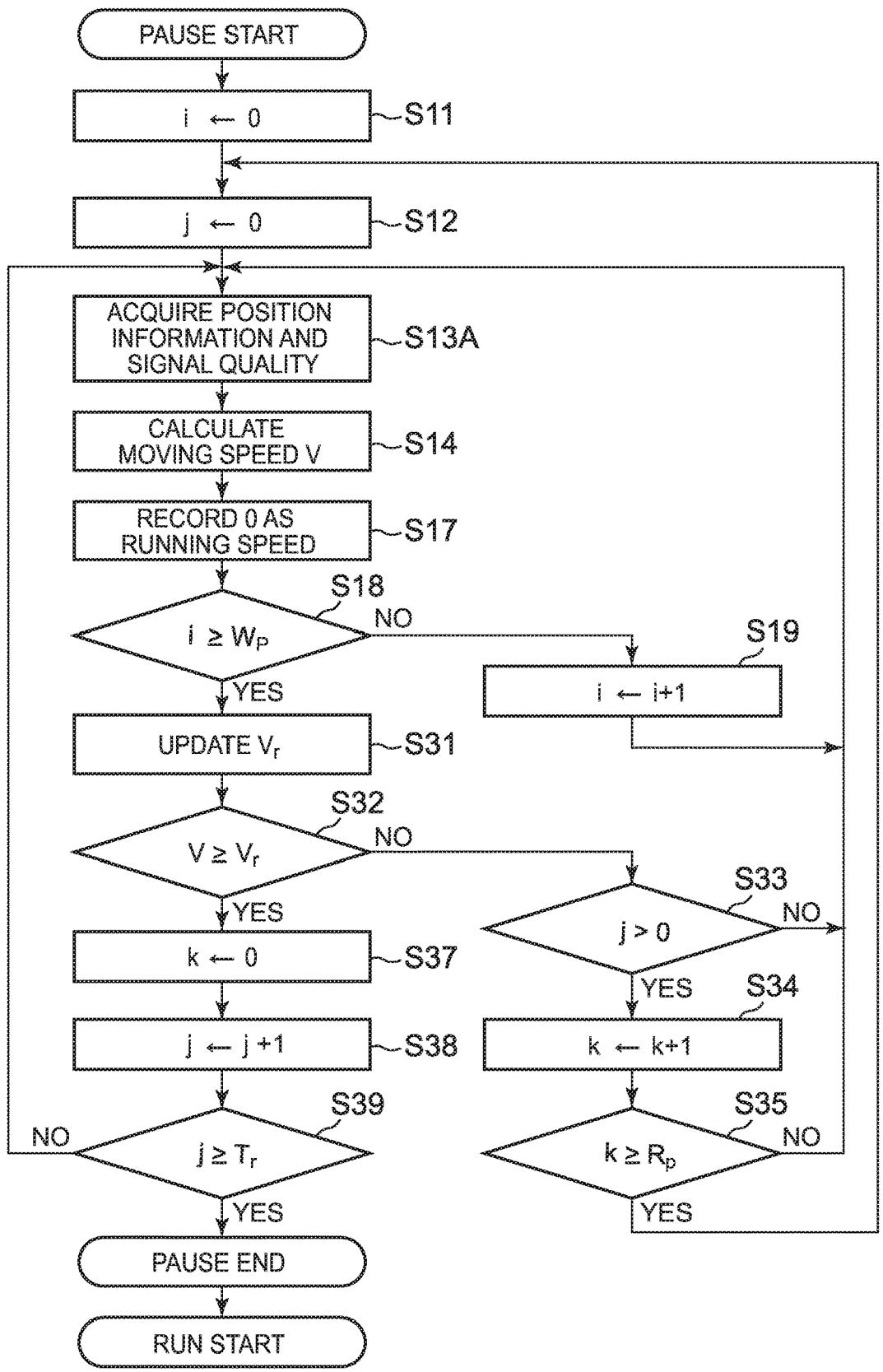
FIG. 6 is a flowchart illustrating a procedure for a moving determination method according to the second embodiment.

In this embodiment, in the running state, as illustrated in FIG. 5, the positioning unit 2 acquires a signal quality (CNR) with position information (S13A) and the control unit 1 changes the pause speed threshold $V_p$ on the basis of the signal quality (S21) and thereafter compares the moving speed V with the changed pause speed threshold $V_p$ (S22). Although the control unit 1 changes the pause speed threshold $V_p$ at the ($W_R$+1)th and subsequent times in FIG. 5, the control unit 1 may change the pause speed threshold $V_p$ from the first time. Moreover, the positioning unit 2 may acquire the signal quality with the position information at the ($W_R$+1)th and subsequent times. Also when the user is in the pause state, the positioning unit 2 acquires a signal quality (CNR) with position information (S13A) and the control unit 1 changes the moving speed threshold $V_r$ (S31) as illustrated in FIG. 6.

(Modification 1)

A signal from the positioning satellite ST is affected by the display unit 6 and noise occurs particularly during driving a color liquid crystal display or a color organic EL display. Therefore, the speed thresholds $V_p$ and $V_r$ may be changed on the basis of whether or not the display unit 6 displays a color image (displays a monochrome image). Specifically, the storage unit 4 previously stores a table as illustrated in Table 3. In this modification, the control unit 1 detects whether or not the color display 62 is currently displaying an image, instead of acquiring the signal quality, at the time of acquiring the position information (S13A). Then, the speed thresholds $V_p$ and $V_r$ are changed (S21, S31) on the basis of a result of the detection. Incidentally, as illustrated in Table 3, preferably settings are made so as not to satisfy $V_p>V_r$ when the display image has changed.

TABLE 3

| | $V_p$ (km/h) | $V_r$ (km/h) |
|---|---|---|
| Monochrome LCD | 1.0 | 6.5 |
| Color LCD/organic EL | 5.0 | 7.0 |

(Modification 2)

In the first and second embodiments and their modifications, a difference between the pause speed threshold $V_p$ and the moving speed threshold $V_r$ is set to be larger than the fluctuation range of the moving speed continued for a long time during user's running as described in the first embodiment, so that the moving speed V in the range of "$V_p \leq V < V_r$," in which a determined state varies depending on whether the state is deceleration in the running state or acceleration in the pause state, is easily and continuously acquired. The difference, however, may be set smaller within a range in which the moving speed V is not easily affected by the measurement error of the positioning unit 2 so as to make it difficult to acquire the moving speed V in the range of "$V_p \leq V < V_r$," continuously. With these settings, the control unit 1 is able to easily determine the state uniquely with respect to the acquired moving speed V. In addition, it is possible to determine only a state in which the user is actually stationary as a pause state, as in the walking mode.

For example, as illustrated in "running mode" on Table 4, the pause speed threshold $V_p$ and the moving speed threshold $V_r$ are set to 4.0 km/h and 5.0 km/h respectively ($V_p$=4.0 km/h and $V_r$=5.0 km/h) when "CNR 45 dB" is satisfied, and settings are made so that the pause speed threshold $V_p$ increases by 0.06 km/h and the moving speed threshold $V_r$ increases by 0.08 km/h each time CNR at 45 dB drops by 1 dB. In comparison with Table 2, Table 4 illustrates that the pause speed threshold $V_p$ in CNR of 20 dB (CNR=20 dB) rises from 5.0 km/h to 5.5 km/h, thereby reducing the difference between the pause speed threshold $V_p$ and the moving speed threshold $V_r$ to 1.5 km/h. In this modification, the difference between the pause speed threshold $V_p$ and the moving speed threshold $V_r$ is set to be smaller when the signal quality is good and set so as to increase as the CNR decreases in order to prevent the control unit 1 from erroneously determining a state transition due to a measurement error of the positioning unit 2. Furthermore, in the walking mode, in which only a state where the user is actually stationary is determined to be a pause state, which is susceptible to a measurement error of the positioning unit 2, it is preferable to set a difference between the pause speed threshold $V_p$ and the moving speed threshold $V_r$ to be larger than in the running mode. In addition, in the same signal quality, the pause speed threshold $V_p$ is set so as not to exceed the moving speed threshold $V_r$, and ideally the pause speed threshold $V_p$ does not exceed the moving speed threshold $V_r$ independently of the signal quality.

TABLE 4

| CNR (dB) | Running mode | | Walking mode | |
|---|---|---|---|---|
| | $V_p$ (km/h) | $V_r$ (km/h) | $V_p$ (km/h) | $V_r$ (km/h) |
| 45~ | 4.0 | 5.0 | 1.5 | 3.0 |
| 20 | 5.5 | 7.0 | 3.0 | 5.0 |
| 15 | 5.8 | 7.4 | 3.3 | 5.4 |

In this modification, the higher the signal quality is, the smaller the difference between the pause speed threshold $V_p$ and the moving speed threshold $V_r$ to be set is. Thereby, when the signal quality is low, it is less unlikely to cause an erroneous determination of a state transition, which is caused by an increase in measurement error. When the difference between the pause speed threshold $V_p$ and the moving speed threshold $V_r$ is set to small, it could easily lead to an erroneous determination of a state transition. Appropriate settings of, for example, the determination values $T_p$ and $T_r$, however, prevent the control unit 1 from determining a state transition erroneously. Incidentally, also with respect to changes in the pause speed threshold $V_p$ and the moving speed threshold $V_r$ depending on whether or not the display unit 6 displays a color image, the settings may be similarly performed. Specifically, when a color image is displayed, a difference between the pause speed threshold $V_p$ and the moving speed threshold $V_r$ may be set to be large. Moreover, for the first embodiment in which the speed thresholds $V_p$ and $V_r$ are fixed, the difference between the pause speed threshold $V_p$ and the moving speed threshold $V_r$ may be set to be small in the same manner.

The control unit 1 may change only one of the pause speed threshold $V_p$ and the moving speed threshold $V_r$, particularly only the pause speed threshold $V_p$ in the running state. Furthermore, the control unit 1 may perform the change with a combination of a change based on a signal quality and a change based on a display image with respect to the speed thresholds $V_p$ and $V_r$.

According to the second embodiment and the modifications thereof, the signal quality is acquired simultaneously with the acquisition of the position information for use in calculating the moving speed V and the speed thresholds $V_p$ and $V_r$ are changed according to the signal quality in each case, by which high-sensitive determination is performed for a state transition in an environment with good signal quality. On the other hand, in an environment with poor signal quality, the control unit changes the speed thresholds according to the acquired signal quality in each case to prevent an erroneous determination of a state transition.

Third Embodiment

Figure 7:
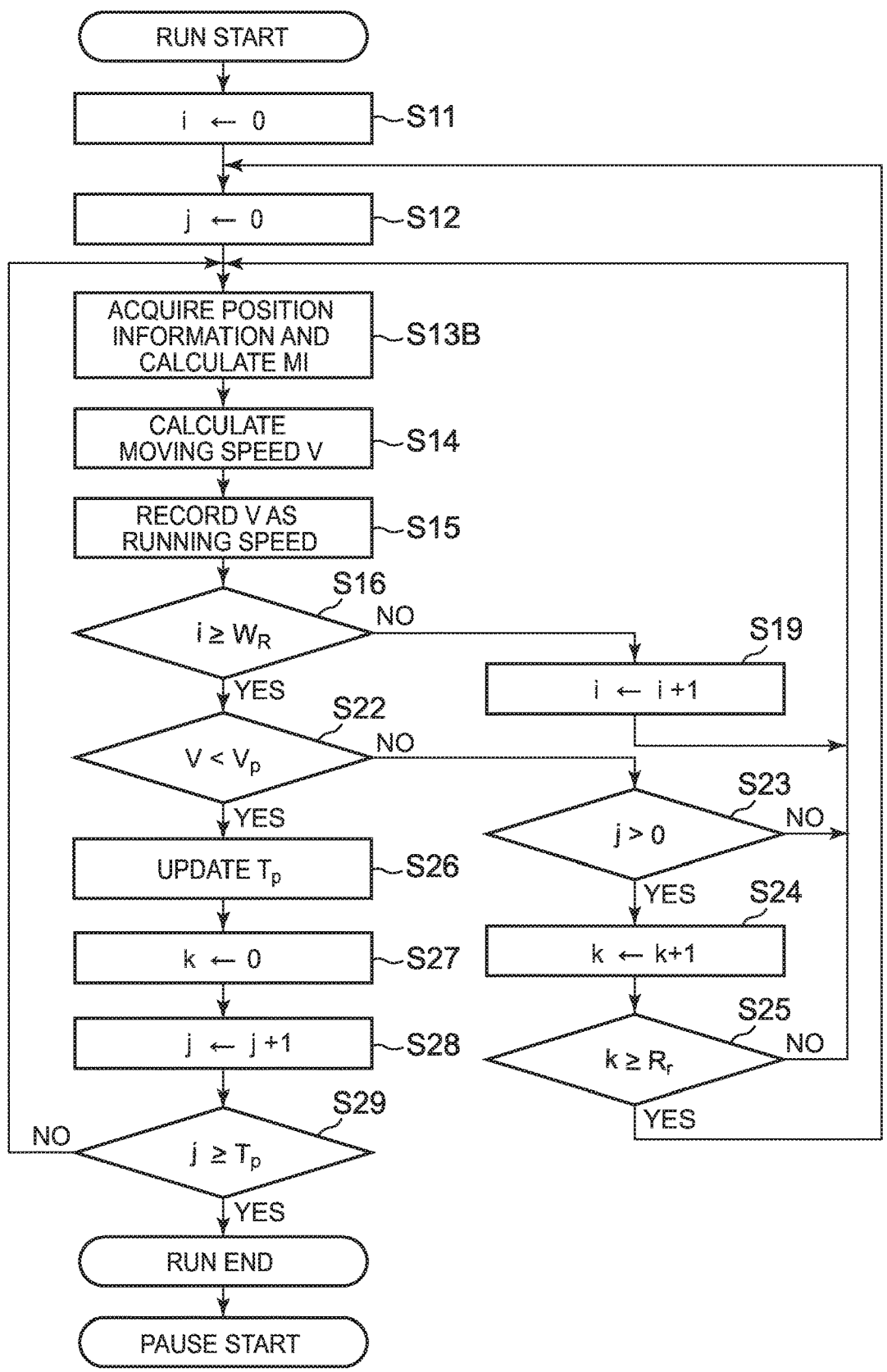
FIG. 7 is a flowchart illustrating a procedure for a pause determination method according to a third embodiment.
Figure 8:
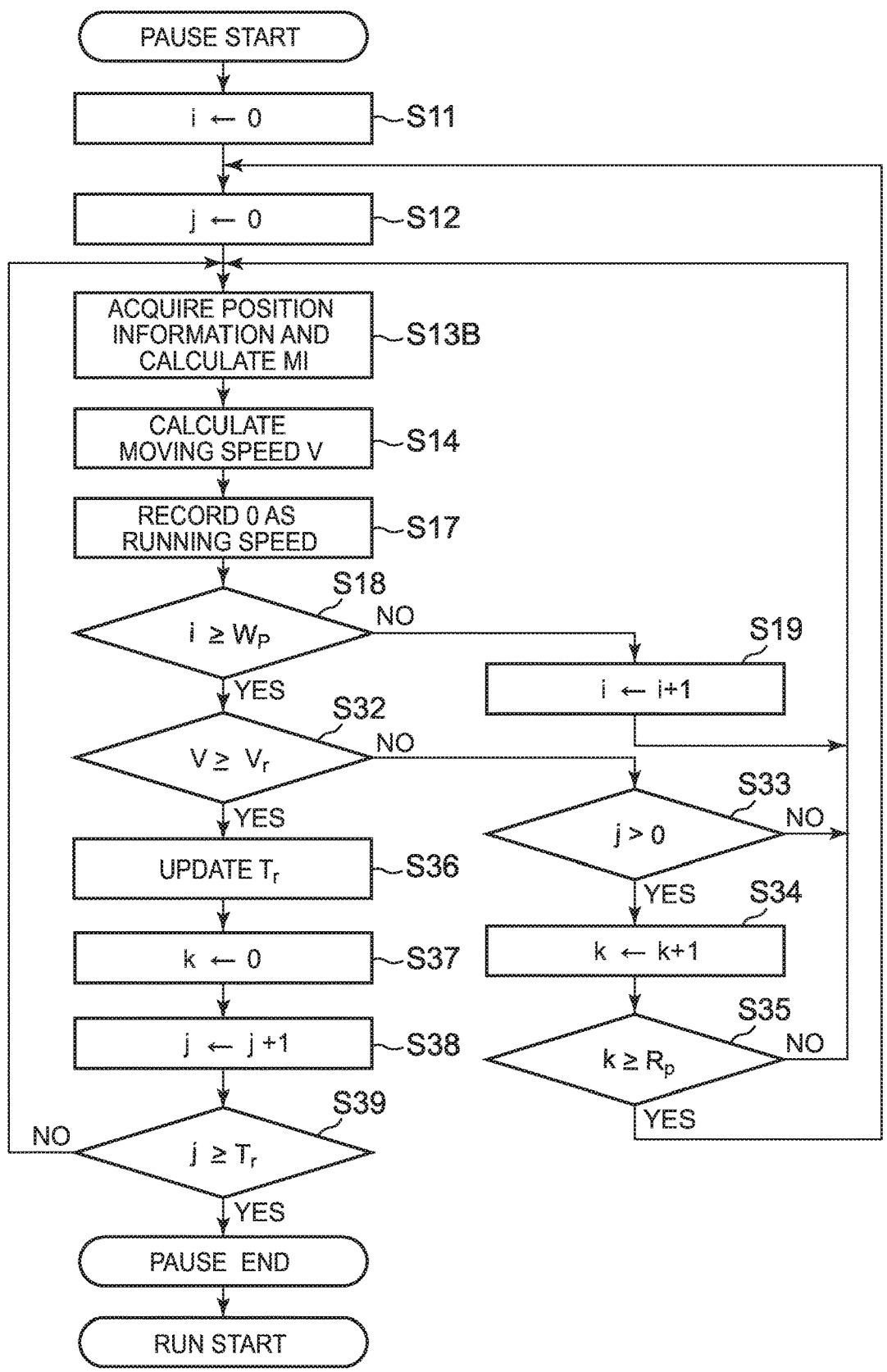
FIG. 8 is a flowchart illustrating a procedure for a moving determination method according to the third embodiment.

The accuracy of the position information decreases in a multipath environment. Therefore, whether the situation is a multipath environment is determined and further the degree thereof is calculated. The thresholds for determining a state transition are changed according to the calculation result, thereby increasing the accuracy of determination. Hereinafter, a determination method according to a third embodiment of the present invention will be described with reference to FIGS. 1, 7, and 8. FIGS. 7 and 8 are flowcharts for describing procedures for a control method according to the third embodiment of the present invention: FIG. 7 is a flowchart of a control method in a moving state; and FIG. 8 is a flowchart of a control method in a pause state.

A pause determination method according to this embodiment is able to be performed by the electronic device 10 illustrated in FIG. 1, similarly to the first and second embodiments. In this embodiment, the capturing/tracking unit 24 is able to decide whether or not the situation is the multipath environment and the multipath status on the basis of the number of correlations. In other words, the control unit 25 obtains a multipath indicator (MI), which indicates the number of multipaths, on the basis of the number of correlations calculated by the capturing/tracking unit 24. The control unit 1 calculates each of the pause determination value $T_p$ in the running state and the moving determination value $T_r$ in the pause state on the basis of MI. Moreover, the storage unit 4 stores programs therefor. For example, as illustrated in Table 5, the pause determination value $T_p$ is increased by 3 and the moving determination value $T_r$ is increased by 1 whenever MI increases by 1 on the basis of "$T_p=10$" and "$T_r=5$" on Table 1 in the first embodiment with "MI=0" as the best non-multipath environment. In this manner, in the same multipath environment, preferably the pause determination value $T_p$ is set to be higher than the moving determination value $T_r$, and the dependence of the pause determination value $T_p$ used for determination of a transition from the running state to the pause state is set to be higher than the dependence of the moving determination value $T_r$.

TABLE 5

| MI | $T_p$ | $T_r$ |
|---|---|---|
| 0 | 10 | 5 |
| 1 | 13 | 6 |
| 2 | 16 | 7 |
| 3 | 19 | 8 |
| 4 | 22 | 9 |

In this embodiment, as illustrated in FIGS. 7 and 8, the positioning unit 2 acquires position information and calculates MI (S13B). In the running state, if the moving speed V is less than the pause speed threshold $V_p$ (S22: YES), the control unit 1 changes the pause determination value $T_p$ according to the immediately-calculated MI (S26) and thereafter compares the determination counter j with the changed pause determination value $T_p$ (S29). Also in the pause state, as illustrated in FIG. 8, the control unit 1 changes the moving determination value $T_r$ (S36). Incidentally, although the positioning unit 2 calculates MI from the first position information acquisition in FIGS. 7 and 8, MI may be calculated at the $(W_R+1)$th and subsequent times (at the $(W_p+1)$th and subsequent times in the pause state). Moreover, the determination values $T_p$ and $T_r$ may be changed (S26, S36) regardless of the comparison result of the moving speed V (S22, S32). For example, the control unit 1 is able to change the pause determination value $T_p$ at the time of writing the moving speed V (S15).

The control unit 1 may change only one of the pause determination value $T_p$ and the moving determination value $T_r$, particularly only the pause determination value $T_p$ in the running state. Moreover, the control unit 1 may change both of the speed thresholds $V_p$ and $V_r$ and the determination values $T_p$ and $T_r$ with a combination of the second embodiment and the modifications thereof. Furthermore, if the signal quality is continuously good or the like such that the changed speed thresholds $V_p$ and $V_r$ have successively small values the predetermined number of times, the control unit 1 may decrement the determination values $T_p$ and $T_r$.

According to the third embodiment, the positioning unit acquires a multipath status when acquiring position information and the control unit changes the determination values $T_p$ and $T_r$ according to the multipath environment, thereby enabling a high-sensitive determination of a state transition in a non-multipath environment. On the other hand, in a multipath environment, the determination values $T_p$ and $T_r$ are changed to higher values, thereby preventing a state transition from being erroneously determined.

The present invention is not limited to the above embodiments.

What is claimed is:

1. An electronic device comprising:
   a positioning unit that is configured to receive a signal from a positioning satellite; and
   a processor that is configured to:
   perform control of the positioning unit to execute a speed acquisition unit function that acquires a moving speed of a user based on the received signal; and
   determine whether the user is in a moving state or in a pause state,
   wherein:
   in the moving state, the processor counts a number of times that the moving speed acquired by the speed acquisition function is less than a pause speed threshold and determines that a transition from the moving state to the pause state has occurred when the number of times that the moving speed is less than the pause speed threshold has reached a pause determination value;
   in the pause state, the processor counts the number of times that the moving speed acquired by the speed acquisition function is equal to or more than a moving speed threshold and determines that a transition from the pause state to the moving state has occurred when the number of times that the moving speed is equal to or more than the moving speed threshold has reached a moving determination value;
   the pause determination value is different from the moving determination value,
   in the moving state, after the processor has counted that the number of times that the moving speed acquired by the speed acquisition function is less than the pause speed threshold is at least one and is less than the pause determination value, the processor counts a number of times that the moving speed acquired by the speed acquisition function is equal to or more than the pause speed threshold, and in a case where the number of times that the moving speed acquired by the speed acquisition function is successively determined by the processor to be equal to or more than the pause speed threshold has reached a moving reset value, the moving reset value being an integer greater than one, the processor resets the count of the number of times that the moving speed acquired by the speed acquisition function is less than the pause speed threshold, wherein the processor maintains the count of the number of times that the moving speed acquired by the speed acquisition function is less than the pause speed threshold unless the number of times that the moving speed acquired by the speed acquisition function is successively determined to be equal to or more than the pause speed threshold has reached the moving reset value,
   in the pause state, after the processor has counted that the number of times that the moving speed acquired by the speed acquisition function is equal to or more than the moving speed threshold is at least one and is less than the moving determination value, the processor counts a number of times that the moving speed acquired by the speed acquisition function is less than the moving speed threshold, and in a case where the number of times that the moving speed acquired by the speed acquisition function is successively determined by the processor to be less than the moving speed threshold has reached a pause reset value, the pause reset value being an integer greater than one and being a value different from the moving reset value, the processor resets the count of the number of times that the moving speed acquired by the speed acquisition function is equal to or more than the moving speed threshold, wherein the processor maintains the count of the number of times that the moving speed acquired by the speed acquisition function is equal to or more than the moving speed threshold unless the number of times that the moving speed acquired by the speed acquisition function is successively determined to be less than the moving speed threshold has reached the pause reset value.

2. The electronic device according to claim 1, wherein, in the moving state, in the case where the number of times that the moving speed acquired by the speed acquisition function is successively determined to be equal to or more than the pause speed threshold has reached the moving reset value, when the number of times that the moving speed thereafter acquired by the speed acquisition function is less than the pause speed threshold has reached the pause determination value in total, the processor determines that a transition from the moving state to the pause state has occurred.

3. The electronic device according to claim 1, wherein, in the pause state, in the case where the number of times that the moving speed acquired by the speed acquisition function is successively determined to be less than the moving speed threshold has reached the pause reset value, when the number of times that the moving speed thereafter acquired by the speed acquisition function is equal to or more than the moving speed threshold has reached the moving determination value in total, the processor determines that a transition from the pause state to the moving state has occurred.

4. The electronic device according to claim 1, wherein the processor performs control of the positioning unit to acquire position information of a current location of the user based on the received signal, and to calculate the moving speed based on a temporal change in the position information to thereby execute the speed acquisition function.

5. The electronic device according to claim 4, wherein:
the positioning unit acquires a signal quality; and
the processor changes the pause speed threshold or the moving speed threshold based on the signal quality.

6. The electronic device according to claim 4, wherein:
the positioning unit calculates a multipath environment indicator value; and
the processor changes the pause determination value or the moving determination value based on the multipath environment indicator value.

7. The electronic device according to claim 1, wherein the pause determination value is higher than the moving determination value.

8. The electronic device according to claim 1, wherein the pause speed threshold is lower than the moving speed threshold.

9. The electronic device according to claim 1, wherein, after the determination of the transition to the moving state, the processor counts a number of times that the speed acquisition function has acquired the moving speed since the determination of the transition to the moving state, and after the number of times that the speed acquisition function has acquired the moving speed since the determination of the transition to the moving state reaches a pause determination standby value, the processor starts counting the number of times that the moving speed acquired by the speed acquisition function is less than the pause speed threshold.

10. The electronic device according to claim 1, wherein, after the determination of the transition to the pause state, the processor counts a number of times that the speed acquisition function has acquired the moving speed since the determination of the transition to the pause state, and after the number of times that the speed acquisition function has acquired the moving speed since the determination of the transition to the moving state reaches a moving determination standby value, the processor counts the number of times that the moving speed acquired by the speed acquisition function is equal to or more than the moving speed threshold.

11. The electronic device according to claim 1, further comprising a memory,
wherein the processor writes 0 as the moving speed into the memory independently of the moving speed acquired by the speed acquisition function in the pause state.

12. The electronic device according to claim 1, further comprising a display unit including a monochrome display that displays a monochrome image and a color display that displays a color image, wherein the processor changes the pause speed threshold or the moving speed threshold based on a display status of the monochrome display or the color display.

13. The electronic device according to claim 12 wherein the electronic device is worn on an arm of the user.

14. The electronic device according to claim 1, wherein the electronic device is worn on an arm of the user.

15. A pause determination method for an electronic device including a positioning unit that is configured to receive a signal from a positioning satellite, and a processor that is configured (a) to perform control of the positioning unit to execute a speed acquisition function that acquires a moving speed of a user based on the received signal and (b) to determine whether the user is in a moving state or in a pause state, the method comprising:
executing the speed acquisition function to acquire the moving speed in the moving state;
counting, by the processor, a number of times that the moving speed acquired by the speed acquisition function in the moving state is less than a pause speed threshold, and determining, by the processor, that a transition to the pause state has occurred when the number of times that the moving speed is less than the pause speed threshold has reached a pause determination value;
a executing the speed acquisition function to acquire moving speed in the pause state;
of counting, by the processor, a number of times that the moving speed acquired by the speed acquisition function in the pause state is equal to or more than a moving speed threshold, and determining that a transition to the moving state has occurred when the number of times that the moving speed is equal to or more than the moving speed threshold has reached a moving determination value,
wherein the pause determination value is different from the moving determination value,
in the moving state, after the processor has counted that the number of times that the moving speed acquired by the speed acquisition function is less than the pause speed threshold is at least one and is less than the pause determination value, the processor counts a number of times that the moving speed acquired by the speed acquisition function is equal to or more than the pause speed threshold, and in a case where the number of times that the moving speed acquired by the speed acquisition function is successively determined by the processor to be equal to or more than the pause speed threshold has reached a moving reset value, the moving reset value being an integer greater than one, the processor resets the count of the number of times that the moving speed acquired by the speed acquisition function is less than the pause speed threshold, wherein the processor maintains the count of the number of times that the moving speed acquired by the speed acquisition function is less than the pause speed threshold unless the number of times that the moving speed acquired by the speed acquisition function is successively determined to be equal to or more than the pause speed threshold has reached the moving reset value,
in the pause state, after the processor has counted that the number of times that the moving speed acquired by the speed acquisition function is equal to or more than the moving speed threshold is at least one and is less than the moving determination value, the processor counts a number of times that the moving speed acquired by the speed acquisition function is less than the moving speed threshold, and in a case where the number of times that the moving speed acquired by the speed acquisition function is successively determined by the processor to be less than the moving speed threshold has reached a pause reset value, the pause reset value being an integer greater than one and being a value different from the moving reset value, the processor resets the count of the number of times that the moving speed acquired by the speed acquisition function is equal to or more than the moving speed threshold, wherein the processor maintains the count of the number of times that the moving speed acquired by the speed acquisition function is equal to or more than the moving speed threshold unless the number of times that the moving speed acquired by the speed acquisition function is successively determined to be less than the moving speed threshold has reached the pause reset value.

16. The pause determination method according to claim 15, wherein said counting the number of times that the moving speed acquired by the speed acquisition function in the moving state is less than the pause speed threshold includes counting the number of times that the moving speed is less than the pause speed threshold in total since the determination of the transition to the moving state and, in the case where the number of times that the moving speed acquired by the speed acquisition function is successively determined to be equal to or more than the pause speed threshold has reached the moving reset value, resetting the count of the number of times that the moving speed is less than the pause speed threshold and counting the number of times that the moving speed is less than the pause speed threshold in total thereafter.

17. The pause determination method according to claim 16, wherein said counting the number of times that the moving speed acquired by the speed acquisition function in the pause state is equal to or more than the moving speed threshold includes counting the number of times that the moving speed is equal to or more than the moving speed threshold in total since the determination of the transition to the pause state and, in the case where the number of times that the moving speed acquired by the speed acquisition function is successively determined to be less than the moving speed threshold has reached the pause reset value, resetting the count of the number of times that the moving speed is equal to or more than the moving speed threshold and counting the number of times that the moving speed is equal to or more than the moving speed threshold in total thereafter.

18. The pause determination method according to claim 15, wherein the pause speed threshold is lower than the moving speed threshold.

19. A non-transitory storage medium storing a control program for causing a computer to perform the pause determination method according to claim 14.

\* \* \* \* \*

UNITED STATES PATENT AND TRADEMARK OFFICE
CERTIFICATE OF CORRECTION

PATENT NO. : 11,525,928 B2
APPLICATION NO. : 16/848227
DATED : December 13, 2022
INVENTOR(S) : Keiichi Imamura It is certified that error appears in the above-identified patent and that said Letters Patent is hereby corrected as shown below:

In the Claims

Claim 1 (Column 17, Line 38), after "acquisition" delete "unit"

Claim 15 (Column 20, Line 9), before "executing" delete "a"

Claim 15 (Column 20, Line 11), before "counting," delete "of"

Claim 19 (Column 22, Line 20), delete "claim 14" and insert --claim 15--

Signed and Sealed this
Twenty-first Day of March, 2023

Katherine Kelly Vidal
*Director of the United States Patent and Trademark Office*